United States Patent [19]

Dalibor

[11] 4,177,183

[45] Dec. 4, 1979

[54] PROCESS FOR THE PREPARATION OF COATINGS COMPOSED OF POLYHYDROXY COMPOUNDS

[75] Inventor: Horst Dalibor, Norderstedt, Fed. Rep. of Germany

[73] Assignee: Hoechst Aktiengesellschaft, Fed. Rep. of Germany

[21] Appl. No.: 789,660

[22] Filed: Apr. 21, 1977

[30] Foreign Application Priority Data

Apr. 29, 1976 [DE] Fed. Rep. of Germany ....... 2618810

[51] Int. Cl.$^2$ .......................... C09D 3/74; C09D 3/52
[52] U.S. Cl. .......................... 260/31.4 R; 260/32.8 R;
260/31.4 EP; 260/42.29; 525/329; 525/374;
525/359; 525/125; 525/193; 428/290; 428/425
[58] Field of Search ....... 260/31.4, 77.5 CR, 836 GL,
260/18 EP, 21, 32.8 R, 856, 859 R; 526/49, 16;
528/46

[56] References Cited

U.S. PATENT DOCUMENTS 3,330,814   7/1967   Vasta ................................... 260/88.1

FOREIGN PATENT DOCUMENTS 1556309 12/1960 France .
1390572  1/1965 France .

*Primary Examiner*—Theodore E. Pertilla
*Attorney, Agent, or Firm*—Gordon W. Hueschen

[57] ABSTRACT

The subject of the invention is a process for the production, by shaping while removing the solvent, of coatings composed of polyhydroxy compounds based on copolymers which contain hydroxyl groups and which are reaction products from mixtures of polymerizable vinyl compounds which contain $\alpha$, $\beta$-ethylenically unsaturated monocarboxylic or dicarboxylic acids and styrene, or derivatives thereof, and of glycidyl esters, as well as polyisocyanates in solvents which do not contain active hydrogen atoms.

7 Claims, No Drawings

PROCESS FOR THE PREPARATION OF COATINGS COMPOSED OF POLYHYDROXY COMPOUNDS

BACKGROUND OF THE INVENTION (1) Field of the Invention

It is an object of the present invention to provide a process for the manufacture of coatings, wherein the sheet-like structures which can be manufactured therefrom have considerably improved properties in various ways. This includes the property that a lacquer which is applied to a metallic substrate and which contains the copolymer solution in combination with organic polyisocyanates, should, after drying in air for three to four days at temperatures of about 20° C., cure in such a way that the film no longer swells under the influence of water and also cannot be removed mechanically by scratching, even if the film is exposed to water for brief periods at temperatures of 50°–70° C.

It is also a further object of the present invention that the copolymer solutions which are present in the reactive lacquer should, in combination with other copolymer solutions which are synthesised, as thermoplastic copolymers, on the basis of lower alkyl methacrylates and acrylic acid or methacrylic acid, permit the manufacture of coating agents which are free from polyisocyanates and which dry at room temperature in a physical manner by solvent evaporation to give films having outstanding properties.

It is a further objective of the present invention to use, in the reactive lacquer, an acrylic resin, containing hydroxyl groups, of a type which, in combination with polyisocyanates provides the binder foundation for air-drying lacquers and stoving lacquers which are suitable for use in the automobile industry as top lacquers, the lacquer being present after stoving in layer thicknesses of about 40 to 80 μm and the top lacquer being located directly on top of the stoved primer of electro-dip lacquer.

In the present-day modern methods for painting motor vehicles in the automobile factory, the coachwork parts are usually coated, after phosphating, with a primer of electro-dip lacquer and this is stoved to give a plastic coating. A sprayed lacquer or a coating composition, which is generally designated as a filler, is then applied to this plastic coating, usually by a spray process, and stoving is carried out once more.

The pigment-containing automobile lacquer formulation is then applied, in the desired pigmentation, by spraying onto this two-coat lacquering or primer and the coachwork is stoved again.

The total coating, which, as explained above, consists of three layers, has a layer thickness of 70–100 μm after stoving, the proportion relating to the outer layer of top lacquer being 30 to 40 μm. In the course of methods of rationalisation in the automobile industry, efforts are being made to change over from the three-layer system to a two-layer structure. In this, the electro-dip coat of lacquer or an equivalent other undercoating should form the first coating layer and after this, the final coat of lacquer with the pigment-containing lacquer should be built up, but the total thickness of the layers applied should have, in total, the same layer thickness. Using the conventional automobile top lacquers, it is, however, not possible, with the customary spraying and stoving treatment, to produce such coatings from pigment-containing lacquer formulations which, after drying in air or after stoving, give lacquer films which are completely uniform (that is to say free from the so-called sagging and free from craters and blisters).

In addition, the copolymers employed according to the invention, and also the combinations of coating agents consisting of the copolymers and the polyisocyanates, should be miscible and compatible with thermoplastic copolymers which are soluble in organic solvents. The use of thermoplastic copolymers makes possible rapid drying, especially when used as a repair lacquer to touch-up defects in painting. Tack-free drying in 5 to 10 minutes at room temperature is required in such cases and the desired resistance to premium motor fuels is achieved by means of the new binder combinations after a drying time of as little as one hour.

A further particular advantage consists in the fact that, for example, it is also possible to touch-up in a partial manner a painted automobile body after final assembly, on which defects in painting still have to be touched-up and the reactive lacquer which is applied consists of a combination of binders composed of the copolymers used according to the invention and polyisocyanates. The touching-up can be carried out on the partially or completely crosslinked combinations of binders. In the combinations of binders which are envisaged as the touching-up lacquer and which are composed of 20 to 80% by weight, preferably 40 to 60% by weight, of the copolymers used according to the invention and 80 to 20% by weight, preferably 60 to 40% by weight, of thermoplastic copolymers, no differences in colour shade are evident between the partially or completely cross-linked reactive lacquer and the touching-up lacquer, provided that the same pigments are employed, in terms of quantity and type.

In addition, the copolymer solutions used according to the invention, which are of lower viscosity, display a better absorption of pigment, both when using inorganic pigments, such as, for example, titanium dioxide, or when using organic pigments, such as, for example, carbon black. When titanium dioxide is used as the pigment, the copolymers which are used according to the invention, and also the reactive lacquer manufactured therefrom, still give films of high gloss at a pigment/binder ratio of 1.5 to 2:1, while the known copolymers and the known reactive lacquers manufactured therefrom, exhibit a marked falling-off in gloss at the same level of pigmentation. In addition, it has been found that the copolymers used according to the invention and the reactive lacquers manufactured therefrom give lacquers of high gloss with carbon black, while the known copolymers and the reactive lacquers manufactured therefrom exhibit matt films at the same level of pigmentation.

It is a further object of the invention to use soluble organic copolymers which are present as a solution having a solids content of 70 to 90% by weight, the copolymer solutions which are formulated ready for spraying having, at 25° C., a viscosity of 25 seconds, measured in a DIN cup having a 4 mm flow orifice, and a solids content of 40 to 65% by weight, preferably 45 to 65% by weight. Thus, the copolymer solutions used according to the invention take account of the requirements, set by environmental protection, for binders of high solids content and low solvent content.

The outstanding advantage of the copolymer solutions which are present in accordance with the invention in the reactive lacquer resides in the fact that it is possible for the hydroxyl groups in the copolymers to crosslink with polyisocyanates at room temperature and also at elevated temperatures and to produce, in the clear lacquer, lacquers of high solids content, in the condition formulated ready for spraying, with a viscosity of 40 seconds, measured at 25° C. in a DIN cup having a 4 mm flow orifice, and a solids content of 61 to 80% by weight, preferably 65 to 80% by weight.

(2) Prior Art

Numerous suggestions to manufacture solvent-resistant and alkali-resistant lacquers by reacting polyisocyanates and copolymers containing hydroxyl groups, and to process the lacquers to give coatings, have been disclosed. DT-AS 1,247,006 describes a process for the manufacture, by the polyisocyanate polyaddition process, of alkali-resistant sheet-like structures which are obtained from polyisocyanates and copolymers containing hydroxyl groups, but which are not adequately stable to water after a reaction time of three to four days at 20° C. These coatings, obtained by this known process, are, therefore, not suitable as top lacquers for external coats of lacquer which are resistant to weathering, since blistering occurs after a very short time and the adhesion of the lacquer to the various metallic substrates falls off and the lacquer thereby comes away from the substrate.

It is also known that polyhydroxy compounds of polyols and polyisocyanates must be cured in order to obtain crosslinked lacquer coatings having good resistance properties. These combinations also display too low a resistance to water and a lower resistance to weathering in the cured lacquer coatings.

French Pat. Specification No. 1,556,309 describes a coating agent which contains solvent and, as the film-forming constituents:

A. a copolymer consisting of
(1) 2–50 parts by weight of an addition product in the ratio 1:1, of a carboxyl group of an $\alpha,\beta$-ethylenically unsaturated acid and an epoxide group of a glycidyl ester of an aliphatic carboxylic acid which contains tertiary C atoms and in which the aliphatic tertiary group contains 4–26 C atoms, and
(2) 98–50 parts by weight of unsaturated, copolymerisable monomers, the total quantity of (1) and (2) adding up to 100 parts by weight, and B. at least one polyisocyanate which contains at least 2 isocyanate groups per molecule, the polyisocyanate being present in relation to the copolymer in a quantity of 0.2–5 equivalents, relative to the hydroxyl groups of the copolymer.

As the examples of this French patent specification show, copolymer solutions are obtained which have a solids content of only 48 to 52%. The content of hydroxyl groups in Examples 1 to 10 is 0.8 to 3.18% by weight in the known copolymers.

In Example 1=0.8% of hydroxyl groups
in Example 2=1% of hydroxyl groups
in Example 3=1.26% of hydroxyl groups
in Example 4=1.52% of hydroxyl groups
in Example 5=1.41% of hydroxyl groups
in Example 6=1.41% of hydroxyl groups
in Example 7=1.66% of hydroxyl groups
in Example 8=1.85% of hydroxyl groups
in Example 9=1.85% of hydroxyl groups
in Example 10=3.18% of hydroxyl groups.

If the procedure indicated in French Pat. Specification No. 1,556,309 is then followed, and as the content of hydroxyl groups in the copolymers is increased, the viscosity also increases. On diluting with xylene to a viscosity of 25 seconds at 25° C., measured in a DIN cup having a 4 mm flow orifice, the solids content of the copolymer solutions also decreases.

It cannot, however, be inferred from French Pat. Specification No. 1,556,309 that the selection of specified solvents and a specified quantity range of a combination of different polymerisable monomers and the use of a combination of initiators makes it possible to manufacture copolymer solutions which have a substantially higher solids content and which establish the use of the new copolymers as binders for lacquer systems which are based on acrylates and have a low solvent content.

The particular advantage of the copolymer solutions used according to the invention consists in the fact that, if the content of hydroxyl groups in the copolymers is increased, the viscosity falls. On diluting with xylene to a viscosity of 25 seconds at 25° C., measured in a DIN cup having a 4 mm flow orifice, the solids content of the copolymer solutions used according to the invention increases.

It is found, surprisingly, that the copolymers which are used according to the invention and which have a hydroxyl group content of 3.5 to 6.5, preferably 4.5 to 5.5, % give lower viscosities than the known copolymers which have the same hydroxyl group content. Thus, when dissolved at 70% strength by weight in ethylglycol acetate, the copolymer solutions used according to the invention have viscosities of U to $Z_4$, preferably X to $Z_3$, measured by the Gardner-Holdt method at 20° C. Proof of this statement is given by a comparison between the copolymer solution 1 (A) used according to the invention and the known comparison copolymers 3 and 4. As 70% strength by weight solutions in ethylglycol acetate, the comparison copolymers 3 and 4 give higher viscosities which are higher than $Z_6$, measured by the Gardner-Holdt method at 20° C.

Compared with the known copolymers, the copolymers used according to the invention exhibit, in the combination with polyisocyanates, the following advantages: better resistance to solvents, higher abrasion resistance and better resistance to weathering in the climate of Florida. In addition, in the combination with polyisocyanates, the copolymers used according to the invention produce, when diluted with acetone, xylene or butyl acetate to a viscosity of 40 seconds at 25° C., measured in a DIN cup having a 4 mm flow orifice, lacequers of a higher solids content which have a solids content in the clear lacquer of 61 to 80% by weight, preferably 65 to 80% by weight. When such clear lacquers or pigmented lacquers are applied by spraying to sheet steel, dry film layers of high thicknesses of 70 to 80 μm which do not exhibit crater formation and blistering, are obtained after a brief period of exposure to air and subsequent stoving.

The known lacquer combinations, which are described in French Pat. Specification No. 1,556,309, only give a solids content of 10 to 60% by weight in the clear lacquer when diluted with acetone, butyl acetate or xylene to 40 seconds at 25° C. When such clear lacquers or pigmented lacquers are applied by spraying to sheet steel, dry film layers of lower thicknesses of 40 to 50 μm which also still exhibit crater formation and blistering, are obtained after a brief period of exposure to air and subsequent stoving.

French Patent Specification 1,390,572 describes a process for the manufacture of copolymers in which an $\alpha,\beta$-unsaturated carboxylic acid or one of its derivatives is copolymerised in a solvent with one or more other vinyl monomers in the presence of a catalyst, and simultaneously or successively the reaction product is reacted with a glycidyl ester of the formula:

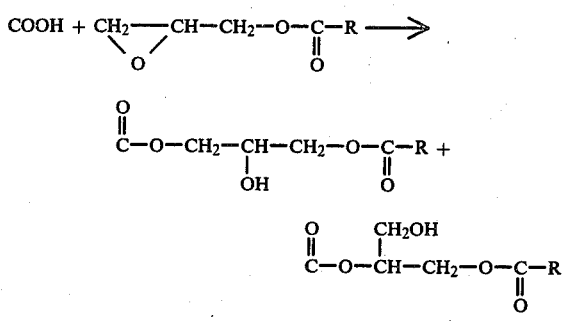

in which R is an aliphatic or aromatic radical which can also be substituted and which is either saturated or contains one or more ethylenically unsaturated bonds.

As the examples of French Pat. Specification No. 1,390,572 show, the copolymers contain, in addition to styrene, several acrylates or mixtures of acrylates and methacrylates or several methacrylates. In addition, it is mentioned under the letter D in the summary of this French patent specification that the copolymers described in that text can be used for coating agents which have been obtained by co-mixing with an isocyanate prepolymer or a polyisocyanate. The coating agents of the type described in that text also display, after curing, a relatively high elasticity and are therefore still capable of being attacked by solvents.

In the book "Lackkunstharze" ("Synthetic Resins for Lacquers") by H. Wagner and H. F. Sarx, Carl Hanser Verlag, Munich 1959, it is stated on page 170, paragraph 1, that monomers which produce very hard homopolymers, such as vinyl chloride, styrene et cetera, are copolymerised with monomers which, for their part, produce very soft homopolymers, such as acrylic acid butyl ester, vinyl isobutyl ether et cetera. As well as a change in the solubility, the resulting products exhibit a particularly advantageous film elasticity. In this case, one speaks of "internal plasticisation" of the hard film-formers. However, it is not evident from these data how the object of the present invention can be achieved in practice. In the book "Paint and Varnish Technology" by William v. Fischer, Verlag Reinhold, New York, 1948, page 222, paragraph 2, the properties of acrylic resins and methacrylic resins are described as generally thermoplastic and very variable between soft, tough semi-liquids and compact, hard solids, and are characterised by colourless transparency and excellent aging properties as well as the capacity to resist sunlight, oxygen and ozone, the properties of the acrylates and methacrylates depending on the molecular weight of the polymers. It is also stated that it is possible to make large variations in the properties of the polymers by increasing the temperature of polymerisation and the concentration of catalysts in the solvent used for polymerisation and by varying the copolymers, and that it is possible to manufacture synthetic resins having any degree of flexibility, as a result of which the simultaneous use of plasticisers is dispensed with. It cannot, however, be inferred from these general data how the object of the present invention can be achieved in practice.

In the brochure "Plexigum, Plexisol, Plexalkyd, Plextol, Rohagit, Acriplex; Eigenschaften, Unterschiede und Beziehungen zueinander" ("Plexigum, Plexisol, Plexalkyd, Plextol, Rohagit and Acriplex; Properties, Differences and Relationships with one another") of Messrs. Röhm & Haas GmbH, Darmstadt, 1963 range of products, it is stated on pages 6 and 7 that polyacrylic esters and polymethacrylic esters are distinguished by the following properties: they are colourless and clear, stable to light, stable against yellowing, even at high temperatures, extremely stable against weathering and aging, outstandingly stable to chemicals and physiologically harmless. The individual polymers differ chiefly in mechanical properties and in solubility. The following is applicable here:

1. The hardness falls off as the number of carbon atoms in the alcohols used for esterification increases.
2. Branched alcohols produce harder polymers than linear alcohols (poly-n-butyl methacrylate and poly-isobutyl methacrylate).
3. Polymethacrylic acid esters are harder than polyacrylic acid esters. However, it is not evident from these general statements either how the object of the present invention could be achieved.

Copolymers which contain hydroxyl groups and which are synthesised from mono-ethylenically unsaturated monomers and have an acid number of up to 40 and contain at least 5 percent by weight of ethylenically unsaturated carboxylic acid units having active hydrogen atoms and which have a structure composed of selected groupings consisting of

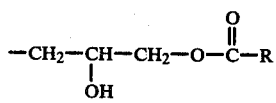

and 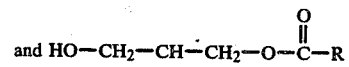

wherein R is a tertiary, aliphatic hydrocarbon radical having the structure

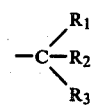

wherein $R_1$ represents $-CH_3$ and $R_2$ and $R_3$ represent alkyl groups having 1 to 12 carbon atoms, the mono-ethylenically unsaturated monomers being, in accordance with claim 6, styrene and acrylic acid and the polymer having an acid number of 5 to 40, have already been described in U.S. Pat. Specification No. 3,330,814. These known copolymers can be used on their own as stoveable coating agents (in the reference cited column 1, lines 56–61). The combination of these copolymers with aminoplast resins (in the cited reference column 3, lines 52–62) and with phenol-formaldehyde resins (in the cited reference column 3, lines 63–66) is also indicated; in addition, it is possible to use epoxypoly-ethers (in the cited reference column 3, lines 67–75) at the same time. These coating agents are stoved at 121° to 205° C. for 30 to 120 minutes. However, the use of these copolymers together with polyisocyanates is not contemplated.

SUMMARY

The subject of the invention is a process for the production, by shaping while removing the solvent, of coatings composed of polyhydroxy compounds based on copolymers which contain hydroxyl groups and which are reaction products from mixtures of polymerisable vinyl compounds which contain α,β-ethylenically unsaturated monocarboxylic or dicarboxylic acids and styrene, or derivatives thereof, and of glycidyl esters, as well as polyisocyanates in solvents which do not contain active hydrogen atoms, characterised in that A. 60–80% by weight of copolymers which contain hydroxyl groups and which have a hydroxyl group content of 3.5 to 6.5% by weight and which have been manufactured, in the presence of mixtures of diacyl peroxides or peresters and alkyl hydroperoxides or dialkyl peroxides as polymerisation initiators, from:

(a) 5–24% by weight of glycidyl esters of α-alkylalkanemonocarboxylic acids and/or α,β-dialkylalkanemonocarboxylic acids of the following empirical formula $C_{12-14}H_{20-26}O_3$ with the slow, uniform addition of (b) 12–30% by weight of hydroxyethyl acrylate and/or hydroxyethyl methacrylate, (c) 1–10% by weight of acrylic acid, ($d_1$) 20–50% by weight of styrene and ($d_2$) 5–35% by weight of methyl methacrylate, the components a, b, c, $d_1$ and $d_2$ having been employed in such quantities that their total adds up to 100% by weight and the polymerisation and condensation reactions taking place simultaneously and jointly and the additional condition applying that the components a, b and c have been employed in such quantities that the copolymers have a hydroxyl group content of 3.5 to 6.5% by weight, and B. 20–40% by weight of an organic polyisocyanate, it being necessary that (A) and (B) together give numerical values of 100% by weight, are employed.

A further embodiment of the preceding process is characterised in that

A. 63–68% by weight of the copolymers which contain hydroxyl groups and

B. 32–37% by weight of an organic triisocyanate which has been obtained by reacting 3 mols of hexamethylene diisocyanate and 1 mol of water, it being necessary that (A) and (B) together give numerical values of 100% by weight, are employed.

A further embodiment of the process of this invention is characterised in that 1–10% by weight of reactive melamine resins, relative to the weight of the binder component, are used at the same time as a further binder.

An embodiment which is specially preferred in characterised in that the component (A) is employed in the form of a solution containing 10–30% by weight of inert organic solvents which are customary in the lacquer industry and 70–90% by weight of copolymers, it being necessary that the % by weight add up to 100%.

An embodiment of the process of the invention which is specially preferred is characterised in that the component (A) which is employed consists of a copolymer which has a hydroxyl group content of 4.5±0.3% by weight and which has been obtained from a mixture consisting of (A'') 20–25% by weight of ethylglycol acetate and (B'') 75–80% by weight of a reaction mixture of the components a to $d_2$, the component to be esterified, that is to say (a) 11–12% by weight of glycidyl esters of α,α-dialkylalkanemonocarboxylic acids of the following empirical formula $C_{13}H_{24}O_3$(+) which have been obtained by reacting tripropylene carbon monoxide and water and which consist almost exclusively of monocarboxylic acids with highly branched $C_{10}$ chains, being heated with the ethylglycol acetate to 165° to 170° C. and a mixture consisting of (b) 25–26% by weight of hydroxyethyl acrylate and/or hydroxyethyl methacrylate, (c) 3–4% by weight of acrylic acid, ($d_1$) 44–48% by weight of styrene, ($d_2$) 10–16% by weight of methyl methacrylate, (e) 2–2.5% by weight of tert.-butyl perbenzoate and (e') 1–1.5% by weight of cumene hydroperoxide, dissolved to form an 80% strength solution in a mixture of alcohols, ketones and cumene, it being necessary that the sum of the monomers a to $d_2$ adds up to 100% by weight, having been added slowly and uniformly in the course of 6 to 10 hours and the temperature having been kept at 170°±5° C. in the course thereof until the solids content of the solution has reached a value of 80±1% by weight, the polymerisation and condensation reactions having taken place jointly and simultaneously and the copolymers having a hydroxyl group content of 4.5±0.3.

(+) Preferably a mixture of glycidyl esters of α,α-dialkylalkanemonocarboxylic acids having a minor content (up to about 10% by weight of the mixture) of glycidyl esters of α-alkylalkanemonocarboxylic acids of the said empirical formula, the mixture having an epoxide equivalent of 240 to 250.

The manufacture of the copolymers and copolymer solutions employed in the process has been described in greater detail in the German patent application of the same date entitled "Copolymer solution composed of acrylic resin, process for its manufacture and the use thereof in reactive lacquers".

It is also possible to use the copolymers (A') in repair lacquers in coating agents which dry physically in air, in quantities of (A') 20–80% by weight of copolymers containing hydroxyl groups, manufactured according to the invention, and (B'') 80–20% by weight of thermoplastic copolymers manufactured from 98–99.5% by weight of methyl methacrylate and/or ethyl methacrylate, and 0.5–2% by weight of methacrylic acid or acrylic acid, it being necessary that the components add up to 100% by weight.

The thermoplastic copolymers (B'') are manufactured by dissolving the monomers in aromatic solvents, such as, for example, benzene, toluene or xylene, and heating the mixture to a temperature of 60° to 120° C., preferably 80° to 100° C., and adding the polymerisation initiator, for example dibenzoyl peroxide or tert.-butyl peroctoate or tert.-butyl perbenzoate, preferably dissolved in aromatic solvents, to the mixture of monomers in the course of about 1 to 5 hours, preferably 2 to 4 hours, and carrying out polymerisation at 80° to 100° C. Polymerisation is carried out here to a solids content of 40 to 55% by weight. The proportion of peroxide is 0.4 to 1% by weight, relative to the monomer mixtures employed. The thermoplastic copolymers, which are present dissolved in toluene or mixtures of xylene and n-butanol as 40% strength by weight solutions, have viscosities of $W-Z_5$, measured by the Gardner-Holdt method at 25° C.

The copolymers (A) used according to the invention also produce, surprisingly, the required good compatibility with thermoplastic copolymers. The known copolymer solutions, on the other hand, exhibit no compatibility with thermoplastic copolymers.

The particular advantage of the compatibility of the copolymer solution (A') used according to the invention with the thermoplastic copolymers (B'') consists in the fact that blemishes in a finished coat of lacquer after final assembly, for example in a finished automobile body, can be touched-up, if it is necessary to overlacquer the coating agent according to the invention which consists of the copolymers manufactured according to the invention and polyisocyanates.

When using combinations of binders consisting of 20 to 80% by weight, preferably 40 to 60% by weight, of copolymer used according to the invention and 80 to 20% by weight, preferably 60 to 40% by weight, of a thermoplastic copolymer, tack-free drying is achieved outstandingly rapidly, within 5 to 10 minutes at approx. 20° C. After a drying time of a further hour at 20° C., surface-hard coats of lacquer are obtained which are resistant to premium motor fuels.

The organic solvents which are used as the component A'' are those which are customary in the lacquer industry, on their own or as mixtures, such as, for example, acetone, methyl ethyl ketone, methyl isobutyl ketone or cyclohexanone, ethyl acetate, butyl acetate, glycol monomethyl ether-acetate, glycol monoethyl ether-acetate, glycol monobutyl ether-acetate, acetoacetic acid methyl ester, acetoacetic acid ethyl ester, acetoacetic acid butyl ester, benzene, toluene, xylene and/or aromatic solvent mixtures having a boiling range of 150° to 200° C.

Organic solvents which, on their own or as mixtures, have a boiling range of 150° to 200° C. are preferred. These include, for example, ethylglycol acetate, acetoacetic acid methyl ester, acetoacetic acid ethyl ester and mixtures of aromatic solvents having a boiling range of 150° to 180° C. Ethylglycol acetate is particularly suitable for the manufacture of the copolymers A. It can be removed, partially or wholly, by distillation and can be replaced by lower-boiling solvents which have a better solubility for the copolymers used. The following are particularly suitable for this purpose: acetone, methyl ethyl ketone, methyl isobutyl ketone, ethyl acetate and butyl acetate.

5 to 24, preferably 10 to 24, % by weight of glycidyl esters of α-alkylalkanemonocarboxylic acids and/or α,α-dialkylalkanemonocarboxylic acids of the following empirical formula $C_{12-14}H_{20-26}O_3$ are used, on their own or as a mixture, as the component a. The empirical formula $C_3H_5O$ applies to the glycidyl radical in the glycidyl esters of the α-alkylalkanemonocarboxylic acids and/or α,α-dialkylalkanemonocarboxylic acids. The mixture of α-alkylalkanoic acids and α,α-dialkylalkanoic acids represent monocarboxylic acids which contain $C_9$, $C_{10}$ and $C_{11}$ chains. The manufacturing processes for the production of the abovementioned α-alkylalkanemonocarboxylic acids are based on the pioneering work of Dr. H. Koch of the Max-Planck-Institute for Coal Research in Mühlheim, Federal Republic of Germany. The acids are completely saturated and are very highly substituted on the carbon atom in the α-position. Acids having two hydrogen atoms on the α-carbon atom are not present and only 6–7% of these acids contain one hydrogen atom. Cyclic material is present in addition (Deutsche Farben Zeitschrift Number 10/Year 16, page 435). It is preferable to employ α-alkylalkanemonocarboxylic acids and/or α,α-dialkylalkanemonocarboxylic acids which have been obtained by reacting tripropylene, carbon monoxide and water and which consist almost entirely of monocarboxylic acids having highly branched $C_{10}$ chains. The empirical formula of the glycidyl ester compound is $C_{13}H_{24}O_3$.

12 to 30% by weight of hydoxyethyl acrylate and/or hydroxyethyl methacrylate are employed as the component b. Hydroxyethyl acrylate imparts high elasticity to the copolymers. This is required particularly in cases where the metal substrate is shaped by an impact process. A further outstanding property of hydroxyethyl acrylate in the copolymers used consists in the fact that it promotes the wetting of pigments, especially in the case of organic pigments and carbon black. Hydroxymethyl methacrylate gives the copolymers used a particularly high film hardness, which is required, in particular, for the formulation of polyisocyanate reactive clear lacquers to give two-coat metal effect lacquering.

18 to 26% by weight of hydroxyethyl acrylate are used particularly preferentially as the component b, since particularly low viscosities produce a high solids content in the condition ready for spraying.

1 to 10% by weight of acrylic acid, preferably 2 to 9% by weight of acrylic acid, are employed as the component c.

20 to 50% by weight of styrene are employed as the component $d_1$; this gives second order transition temperatures of about 100° C. as a homopolymer and can thus be regarded as a so-called hard monomer which imparts the desired film hardness to the copolymers used.

5 to 35% by weight, preferably 10 to 35% by weight, of methyl methacrylate are employed as the component $d_2$. As a copolymerisation component, methyl methacrylate imparts a particularly high resistance to weathering, especially in weathering tests in the Florida climate, to the copolymers used.

Mixtures of peroxides consisting of at least two peroxides are used as the polymerisation initiators in the manufacture of the copolymers used. The mixtures of peroxides have a different chemical structure.

Peroxides of the first group e are represented by diacyl peroxides, such as dibenzoyl peroxide, or peresters, such as tert.-butyl perbenzoate, tert.-butyl peroctoate or tert.-butyl perisononanate.

Peroxides of the second group e' are represented by alkyl hydroperoxides, such as tert.-butyl hydroperoxide and cumene hydroperoxide, or dialkyl peroxides, such as di-tert.-butyl peroxide or dicumyl peroxide.

In each case, 1 to 3.5% by weight of a peroxide from the first group e and 1 to 3% by weight of a peroxide from the second group, relative to 100% by weight of the components a, b, c, $d_1$ and $d_2$, are used as the mixtures of peroxides.

The following combinations of peroxides from the groups one and two are employed: dibenzoyl peroxide/tert.-butyl hydroperoxide; dibenzoyl peroxide/cumene hydroperoxide; dibenzoyl peroxide/dicumyl peroxide; tert.-butyl perbenzoate/butyl hydroperoxide; tert.-butyl perbenzoate/cumene hydroperoxide; tert.-butyl perbenzoate/di-tert.-butyl peroxide; tert.-butyl perbenzoate/dicumyl peroxide; tert.-butyl peroctoate/-tert.-butyl hydroperoxide; tert.-butyl peroctoate/cumene hydroperoxide; tert.-butyl peroctoate/di-tert.-butyl peroxide; tert.-butyl peroctoate/dicumyl peroxide; tert.-butyl perisononanate/tert.-butyl hydroperoxide; tert.-butyl perisononanate/cumyl hydroperoxide; tert.-butyl perisononanate/di-tert.-butyl peroxide or tert.-butyl perisononanate/dicumyl peroxide.

The preferred embodiment includes the following combinations of peroxides: dibenzoyl peroxide/cumene hydroperoxide; dibenzoyl peroxide/di-tert.-butyl peroxide; tert.-peroctoate/cumene hydroperoxide; tert.-butyl peroctoate/di-tert.-butyl peroxide; tert.-butyl perbenzoate/cumene hydroperoxide and tert.-butyl perbenzoate/di-tert.-butyl peroxide.

Mixtures of peroxides which contain, as the component e, 1.5 to 2.5% by weight of tert.-butyl perbenzoate and, as e′, 1 to 2.5% by weight of cumene hydroperoxide, dissolved to form an 80% strength solution in a mixture of alcohols, ketones and cumene, relative to 100% by weight of the components a, b, c, $d_1$ and $d_2$, are the most preferred embodiment. It is found, surprisingly, that, in the most preferred embodiment of the peroxide mixtures and in the most preferred embodiment of the copolymer solution, 75 to 85% strength by weight copolymer solutions in ethylglycol acetate are obtained, which, as a 70% strength by weight solution in ethylglycol acetate, give a viscosity of X–$Z_3$ by the Gardner-Holdt method at 25° C. and, when an 80% strength by weight solution in ethylglycol acetate is diluted with xylene to 25 seconds, measured at 25° C. in a DIN cup having a 4 mm flow orifice, give a solids content of 45 to 65% by weight.

The mixtures of peroxides are generally dissolved in the monomers or are added separately to the polymerisation medium, solvent or solvent mixtures. In some cases, small proportions of the mixtures of peroxides, up to 20% by weight of the quantity of peroxides employed, can also be dissolved in the solvent or solvent mixtures and the remaining quantity of the peroxide mixtures is added uniformly to the polymerisation medium, solvent or solvent mixture, separately from the monomers or dissolved in them.

It proves particularly suitable to dissolve the tert.-butyl perbenzoate of the peroxide mixtures in the monomers and to add the mixtures which are produced, uniformly within a time of 6 to 10 hours, to the polymerisation and condensation medium, which consists of the solvent or solvent mixture and glycidyl esters of α-alkylalkanemonocarboxylic acids and/or α,α-dialkylalkanemonocarboxylic acids.

As a result of this the optimum lowering of viscosity is achieved, which gives the copolymers which are used. The reaction of acrylic acid with the glycidyl esters of the α,α-dialkylalkanemonocarboxylic acids proceeds approximately according to the following formula:

CH$_2$=CH—COOH +

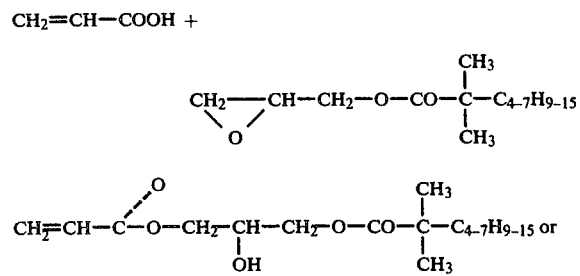

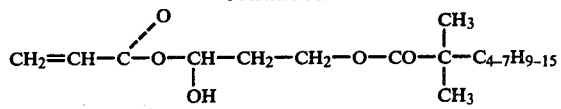

The reaction between the carboxyl group and the glycidyl group is carried out under the conditions of 0.95 to 1.1 mols of acrylic acid per mol of glycidyl ester of α,α-dialkylalkanemonocarboxylic acids of the following empirical formula $C_{12-14}H_{20-26}O_3$, having an epoxide equivalent of 240–250.

The acid number of the copolymers is 5 to 12 and is provided by excess acrylic acid and by the organic acids formed as a scission product in the decomposition of the peroxide, and is to be regarded as external acid.

The hydroxyl group content of the copolymers is 3.5 to 6.5, preferably 4 to 5.5, % by weight.

The content of hydroxyl groups in the copolymers is calculated by means of the following formula:

$$\% \text{ OH} = \frac{1 \text{ mol OH in g} \times \begin{smallmatrix}\text{sample weight of compound}\\ \text{containing hydroxyl groups}\end{smallmatrix} \times 100}{\begin{smallmatrix}\text{Molecular weight of the}\\ \text{compounds containing}\\ \text{hydroxyl groups}\end{smallmatrix} \times \begin{smallmatrix}\text{Total sample weight of the}\\ \text{components } a \text{ to } d_2\end{smallmatrix}}$$

Thus, the reaction product from 1 mol of acrylic acid, which corresponds to 72 g of acrylic acid, and 1 mol of glycidyl ester of α,α-dialkylalkanemonocarboxylic acids of the following empirical formula $C_{12-14}H_{20-26}O_3$ which has an average epoxide equivalent of 245, which corresponds to 245 g of glycidyl ester, gives a molecular weight of 317.

Under the conditions of an equivalent conversion, there are, for 10 g of the abovementioned glycidyl ester, 2.94 g of acrylic acid, which corresponds to a sample weight of 12.94 g of the compound containing hydroxyl groups.

The following numerical expression is then applicable to the formula set out above:

$$\frac{17 \text{ g} \times 12.94 \text{ g} \times 100}{317 \text{ g} \times 100 \text{ g of total sample weight of the components } a \text{ to } d_2} = 0.69\% \text{ OH}$$

The other compounds containing hydroxyl groups have the following molecular weights: hydroxyethyl acrylate, molecular weight 116 and hydroxyethyl methacrylate, molecular weight 130. For 26% by weight of hydroxyethyl acrylate, the following OH percentages result from the following numerical expression:

$$\frac{17 \text{ g} \times 26 \text{ g} \times 100}{116 \text{ g} \times 100 \text{ g of total sample weight of the components } a \text{ to } d_2} = 3.81\% \text{ OH}$$

The sum of both compounds which contain hydroxyl groups, the reaction product of glycidyl ester and acrylic acid and the hydroxyethyl acrylate, gives a hydroxyl group content of 4.5% of OH.

If the conditions that the components a, b and c are employed in such quantities that the copolymers have a hydroxyl group content of 3.5 to 6.5% by weight, preferably 4 to 5.5% by weight, are maintained, the components a and b should be adjusted to the component c in such a way that the desired hydroxyl group content is achieved.

This means that, if smaller percentages by weight of the components a and b are employed, higher percentages by weight of the component c must be taken in order to manufacture the copolymers which are used. If larger percentages by weight of the components (a) and (b) are employed, smaller percentages by weight of the component (c) must be taken in order to manufacture the copolymers (A) which are used.

The starting point in this approach must always be that the copolymers which are used should produce as high a solids content as possible and the relevant test viscosity is that obtained on diluting the copolymer solutions with xylene to a flow viscosity of 25 seconds at 25° C., measured in a DIN cup having a 4 mm flow orifice.

The copolymers (A) which are used are manufactured by heating the solvents or solvent mixtures, which preferably have a boiling range of 150° to 180° C., to 165° to 180° C. in a reaction flask as a mixture with the glycidyl esters of α-alkylalkanemonocarboxylic acids and/or α,α-dialkylalkanemonocarboxylic acids, dissolved in the solvent. The mixtures of monomers a, b, c, $d_1$ and $d_2$ and the peroxide mixtures e and e' are added slowly and uniformly over a period of time of 6 to 10 hours, separately, or preferably jointly, to this heated mixture in the reaction flask, the polymerisation temperature not being allowed to fall below 165° C. After the addition of monomer and peroxide, polymerisation is carried out at reflux temperature for a further 2 to 3 hours until the solids content of the solution has reached the theoretical value of between 70 and 90% by weight. The copolymers used must have the predetermined test viscosity of X to $Z_4$, measured by the Gardner-Holdt method, for 70% strength by weight copolymer solutions in ethylglycol acetate. The copolymers are manufactured under the proviso that the polymerisation and condensation reactions take place simultaneously and jointly at 165° to 180° C.

The copolymers A are used as the component A in reactive lacquers together with a polyisocyanate component B.

The following polyisocyanates, for example, can be employed as the component B: ethylene diisocyanate, propylene diisocyanate, tetramethylene diisocyanate, hexamethylene diisocyanate, 1,3-dimethylbenzene diisocyanate, 1,4-dimethylcyclohexane diisocyanate, 1-methylcyclohexane 2,4-diisocyanate, 4,4'-methylene-bis(cyclohexyl diisocyanate), phenylene diisocyanate, 2,4-toluylene diisocyanate, naphthylene diisocyanate, 3-isocyanatomethyl-3,5,5-trimethylcyclohexyl isocyanate, lysine diisocyanate, triphenylmethane triisocyanate, trimethylbenzene 2,4,6-triisocyanate, 1-methylbenzene 2,4,6-triisocyanate and diphenyl 2,4,4'-triisocyanate; diisocyanates or triisocyanates which have been manufactured by reacting a polyisocyanate with a low-molecular diol or triol (for example ethylene glycol, propylene glycol, 1,3-butylene glycol, neopentyl glycol, 2,2,4-trimethyl-1,3-pentanediol, hexanediol, trimethylolpropane or trimethylolethane); and cyanurates which have been obtained by reacting the said diisocyanates in a cyclisation reaction. A particularly valuable polyisocyanate is the triisocyanate which contains biuret groups and which is obtained by reacting 3 mols of hexamethylene diisocyanate and one mol of water.

Instead of the polyisocyanates, it is also possible to use compounds which split off polyisocyanates and also reaction products, containing isocyanate groups, of polyhydric alcohols and polyisocyanates, for example the reaction product of 1 mol of trimethylolpropane and 3 mols of toluylene diisocyanate, and also trimerised or polymerised isocyanates, such as are described, say, in German Patent Specification 951,168.

In addition, a reaction product of 1 mol of water and 3 mols of hexamethylene diisocyanate having an NCO content of 16–17% by weight is also possible. The last-mentioned reaction product of water and hexamethylene diisocyanate is particularly preferred. The NCO content of the reaction product is applicable to a 75% strength solution in xylene/ethylglycol acetate.

When used in reactive lacquers, the reaction of the copolymers A which contain hydroxyl groups with the organic polyisocyanates B can, moreover, be carried out with 0.5 to 1.3 NCO groups per hydroxyl group, depending on the end use of the reaction products. It is preferable to carry out the reaction in such a way that the quantities of the organic polyisocyanate, relative to the total hydroxyl content of the components present in the reaction mixture, are present in an amount of 0.7 to 1.0 isocyanate group per hydroxyl group.

In order to use the copolymers, the mixtures of copolymers A which contain hydroxyl groups and which contain solvent, and polyisocyanate B are applied to the appropriate substrates in the simplest imaginable manner, say after adding known auxiliaries, such as levelling agents and pigments or dyestuffs, by spraying, dipping, pouring, brushing or other suitable measures, and the sheet-like structures are dried at room temperature; in special cases, say when using compounds which split off isocyanates, it is possible to stove the coatings, which depends essentially on the substrates used and on the requirements for the coatings set by practical use.

The copolymers used in the process can be employed together with polyisocyanates, in the reactive lacquers already illustrated, for the production of coatings or coverings on substrates of the most diverse kind, for example porous or non-porous substrates, such as textile non-wovens, leather or plastics. The production of coatings on wood or metals is singled out particularly. In every case, high-gloss, pore-free, elastic coatings which have a very hard surface and are resistant to solvents are obtained, which can be treated both with strong inorganic acids and with strong alkali metal hydroxide solutions, without the coatings being attacked even to the slightest extent. Coatings of this type display, in addition, an outstanding resistance to weathering and resistance to yellowing.

In pigmented coating compositions based on the polyisocyanate reactive lacquer binder solutions according to the invention, the total solids content in the coating composition is between 62 and 90% by weight, preferably between 67 and 90% by weight. The ratio of pigment to binder can be between 1:20 and 2:1. The following can be added as pigments: inorganic pigments, such as chrome yellow, Prussian blue, Brunswick green and titanium pigments, for example titanium dioxide, extended titanium pigments (which have been extended either with precipitated or natural extenders, such as alkaline earth metal sulphates, for example calcium sulphate and barium sulphate), tinted titanium pigments and titanates, such as barium, tin, lead and magnesium titanates. Other types of inorganic pigments can also be used, for example zinc sulphide pigments, such as zinc sulphide, lithopone, extended zinc sulphide pigments, such as lithopone on a calcium compound substrate, or zinc sulphide extended with natural extenders, zinc oxide or antimony oxide, or organic pigments, that is to say organic dyestuffs which are free from sulphonic acid groups, carboxylic acid groups or other groups which impart solubility in water. Pigments also include, conceptually, other organic dyestuffs which are insoluble in water, for example calcium or barium lakes of azo dyestuffs.

The constituents for the stoving lacquers to be used can be processed to give lacquers by customary processes, preferably as follows. The pigment and a suitable quantity of solvent are mixed with part of the copolymers according to the invention to give a pasty or solid pigment taste. After the mixture has been well dispersed in a stirred ball mill, the residual copolymer and other additives are combined with the resulting paste or dispersion and the mixture is then formulated with the solvents, preferably xylene, butyl acetate and/or ethylglycol acetate or acetone, to give a viscosity at which it can be sprayed and a solids content of 62 to 90% by weight, preferably between 67 and 90% by weight, of non-voltatile substances.

Preparation of the Copolymer 1 (A) which contains Hydroxyl Groups (A) 28 g of ethylglycol acetate (=21.9% by weight) and (B) 100 g of component B (=78.1% by weight) are reacted as follows: Component A) plus (a) 11.7 g of glycidyl esters of $\alpha,\alpha$-dialkylalkanemonocarboxylic acids of the following empirical formula $C_{13}H_{24}O_3$ having an epoxide equivalent of 240–250, designated only as glycidyl esters of $\alpha,\alpha$-dialkylmonocarboxylic acids in the following text, are heated to 167° C. in a flask equipped with a stirrer, reflux condenser and water separator, as well as a thermometer, and a mixture (component B of hydroxy copolymer) consisting of:

(b) 25.5 g of hydroxyethyl acrylate,
(c) 3.3 g of acrylic acid,
($d_1$) 46.2 g of styrene and
($d_2$) 13.3 g of methyl methacrylate, it being necessary for the % by weight of the components a, b, c, $d_1$ and $d_2$ to add up to 100% by weight, and
(e) 2.7 g of tert.-butyl perbenzoate =2% by weight and
(e') 2.0 g of 80% strength cumene hydroperoxide=1.2% by weight, the % by weight figures relating to the total mixture of the components A and B, is added uniformly, at a temperature which rises to 170° C., in the course of 7 hours, while the mixture boils and the reflux is cooled. When the addition is complete, polymerisation is continued for a further 2 hours until a solids content of 81.0% by weight has been reached.

This copolymer illustrates the most preferred embodiment of the invention for the manufacture of lacquers.

The acid number of the solid component is 7.5. The viscosity of a 70% strength by weight solution in ethylglycol acetate is $Z_2$ to $Z_3$ by the Gardner-Holdt method. When the viscosity is adjusted with xylene to 25 seconds at 25° C., measured in a DIN cup having a 4 mm flow orifice, the solids content is 47% by weight. The copolymer has a hydroxyl group content of 4.5% by weight.

Comparison test according to the state of the art

Comparison Test 1 (taking into account the Example in French Patent Specification 1,556,309, which is the nearest approach to the invention).

The hydroxyl group content, relative to the copolymers, in the Examples 1 to 10 in French Pat. No. 1,556,309 is:

in Example 1=0.8% of hydroxyl groups
in Example 2=1% of hydroxyl groups
in Example 3=1.26% of hydroxyl groups
in Example 4=1.52% of hydroxyl groups
in Example 5=1.41% of hydroxyl groups
in Example 6=1.41% of hydroxyl groups
in Example 7=1.66% of hydroxyl groups
in Example 8=1.85% of hydroxyl groups in Example 9=1.85% of hydroxyl groups
in Example 10=3.18% of hydroxyl groups The nearest approach to the invention is Example 10 in French Patent Specification 1,556,309, which has a hydroxyl group content of 3.18%.

The procedure described in Example 10 of French Patent Specification 1,556,309 is followed.

10 parts by weight of 2-hydroxyethyl methacrylate,
30 parts by weight of methyl methacrylate,
25 parts by weight of styrene,
15 parts by weight of ethyl acrylate,
20 parts by weight of a reaction product obtained in accordance with reaction (a),
1.3 parts by weight of lauryl-mercaptan,
1.5 parts by weight of azobisisobutyronitrile,
20 parts by weight of butyl acetate,
20 parts by weight of ethyl acetate,
30 parts by weight of toluene,
10 parts by weight of ethylglycol acetate and
20 parts by weight of xylene were converted into a solution of copolymers. The viscosity of the 50% strength by weight solution is R by the Gardner-Holdt method.

The copolymer solution has a considerable sediment and is also turbid. The constituents which have precipitated in a solid form could be removed by filtration. The turbidity of the resin solution could not be eliminated. When the viscosity is adjusted with xylene to 25 seconds at 25° C., measured in a DIN cup having a 4 mm flow orifice, the solids content is 37% by weight. The copolymer has a hydroxyl group content of 3.18% by weight.

Comparison test taking into account the state of the art and the inventive concept of the present invention Comparison Test 2

The procedure described in Comparison Test 1 is followed, the monomers alone having been adapted to the copolymer 1 (A) which was used. The following were used:

25.5% by weight of hydroxyethyl acrylate,
13.3% by weight of methyl methacrylate,
46.2% by weight of styrene and
15% by weight of a reaction product obtained in accordance with reaction (a) of French Patent Specification 1,556,309. The copolymer solution displayed a particularly strong, milky turbidity which could not be removed by filtration. The copolymer has a hydroxyl group content of 4.5% by weight. The viscosity of a 50% strength by weight solution was Z, measured by the Gardner- Holdt method at 20° C. When the viscosity was adjusted with xylene to 25 seconds at 25° C., measured in a DIN cup having a 4 mm flow orifice, the solids content was 28% by weight.

Comparison Test 3

The procedure described for copolymer 1 (A) was followed, but, in divergence, polymerisation was carried out at a temperature of 160° C. using tert.-butyl perbenzoate alone. The viscosity of a 70% strength by weight solution is ethylglycol acetate, measured by the Gardner-Holdt method, is higher than $Z_6$. The resin solution exhibits a turbidity which could not be removed by filtration. When the viscosity was adjusted with xylene to 25 seconds at 25° C., measured in a DIN cup having a 4 mm flow orifice, the solids content was 38% by weight.

Comparison Test 4

The procedure described for copolymer 1 (A) was followed, but, in divergence, polymerisation was carried out at a temperature of 160° C. using cumene hydroperoxide alone, as an 80% strength solution in a mixture of alcohols, ketones and cumene. The viscosity of a 70% strength by weight solution in ethylglycol acetate, measured by the Gardner-Holdt method, is higher than $Z_6$. The resin solution exhibits a strong turbidity which cannot be removed by filtration. When the viscosity was adjusted with xylene to 25 seconds at 25° C., measured in a DIN cup having a 4 mm flow orifice, the solids content was 34% by weight.

Preparation of the copolymer 2 (A) which contains hydroxyl Groups

A 28 g of ethylglycol acetate=21.9% by weight and B 100 g of component B=78.1% by weight are reacted as follows:

Component A and
(a) 24 g of glycidyl esters, as described in Example 1, are heated to 172° C. in a flask equipped with a stirrer, a reflux condenser and a water separator and a thermometer and a mixture consisting of
(b) 19.1 g of hydroxyethyl methacrylate,
(c) 7.2 g of acrylic acid,
($d_1$) 28.1 g of styrene and
($d_2$) 21.6 g of methyl methacrylate, it being necessary for the % by weight of the components a, b, c, $d_1$ and $d_2$ to add up to 100% by weight, and
(e) 2.7 g of tert.-butyl perbenzoate=2% by weight and
(e') 2.0 g of 80% strength cumene hydroperoxide=1.2% by weight,
the percentage by weight figures relating to the total weight of the components (A) and (B), is added uniformly in the course of 7 hours while the mixture boils and the reflux is simultaneously cooled. When the addition is complete, polymerisation is continued for a further 2 hours until a solids content of 80% by weight has been reached. The acid number of the solid component is 11. The viscosity of a 70% strength by weight solution in ethylglycol acetate is Y-Z, measured by the Gardner-Holdt method. When the viscosity is adjusted with xylene to 25 seconds at 25° C., measured in a DIN cup having a 4 mm flow orifice, the solids content is 52% by weight. The copolymer has a hydroxyl group content of 4.17% by weight. The copolymer solution contains no insoluble solid components and is free from turbidity.

Preparation of the thermoplastic copolymer 1

600 g of toluene,
200 g of ethyl methacrylate,
4 g of acrylic acid and
296 g of methyl methacrylate are heated to reflux temperature in a flask equipped with a stirrer and a reflux condenser and a water separator and the following mixture, consisting of: 150 g of toluene and
3.5 g of dibenzoyl peroxide, as a 75% strength suspension in water,
is added uniformly in the course of 2 hours. After a polymerisation time of 2 hours, a further 2 g of dibenzoyl peroxide, as a 75% strength suspension in water, are added and polymerisation is continued under reflux. The solids content of the solution is 40% by weight. The viscosity of the solution exhibits a value of X-Y, measured by the Gardner-Holdt method at 25° C. The acid number is 5.

Preparation of the thermoplastic copolymer 2

300 g of xylene,
1.5 g of methacrylic acid and
300 g of methyl methacrylate are heated to 85° C. in a flask equipped with a stirrer and a reflux condenser and a water separator and the following mixture, consisting of:
50 g of xylene and
2.5 g of dibenzoyl peroxide, as a 75% strength suspension in water,
is added uniformly in the course of 3 hours. After polymerising for 2 hours at a constant temperature, a further g of dibenzoyl peroxide, as a 75% strength suspension in water, is added and polymerisation is continued for a further 2 hours until the theoretical solids content of 46% by weight has been reached. When diluted with n-butanol to 40% by weight, the solution has a viscosity of $Z_3$-$Z_4$, measured by the Gardner-Holdt method at 25° C. The acid number of the polymer is 4.

EXAMPLE 1

Reactive lacquer based on 70 percent by weight of copolymer 1 (A) and 30 percent by weight of an organic triisocyanate, relative to the solids content.

61.6 g of a solution of copolymer 1 in ethylglycol acetate (copolymer 1 (A), dissolved solids 81% by weight) are dissolved in a 1:1 mixture of xylene and ethylglycol acetate, together with 28.6 g of a 75% strength by weight solution of a triisocyanate which has a NCO content of 16.5 to 17.0% by weight and which has been obtained by reacting 3 mols of hexamethylene diisocyanate and 1 mol of water. 0.5 g of diethylethanolamine are added and thoroughly mixed and xylene is added to adjust the mixture to spraying viscosity, namely 25 seconds at 25° C., measured in a DIN cup having a 4 mm flow orifice. The lacquer was applied to glass plates at a wet film layer thickness of 90 μm and was dried in air at 18° to 20° C. The pendulum hardness, measured by König's method (DIN 53,157) is 60 seconds after one day, 140 seconds after three days and 180 seconds after seven days. When stoved for 30 minutes at 80° C., the films gave pendulum hardnesses of 102 seconds, rising to 180 seconds after being stored for one day at room temperature and to 202 seconds after 3 days. After stoving for 30 minutes at 120° C., the films gave pendulum hardnesses of 203 seconds which did not alter further on storage. The cured films were particularly insensitive towards the fingernail test and were very resistant to xylene and acetone.

After weathering for 18 months in the Florida climate, a top coat of lacquer (pigmented with 0.6 part by weight of rutile:1 part by weight of binder combination) applied to steel sheets which had been primed and zinc phosphated, gave a loss of gloss of only 10% compared with the gloss measured before weathering.

Black lacquers with a particularly high gloss are obtained if 20 parts by weight of FW 200 carbon black together with 270 parts by weight of the copolymer 1 solution, calcium naphthenate and silicone oil, as a 1% strength solution in xylene, are subjected, using an appropriate quantity of xylene and butyl acetate, to a grinding process lasting about 30 to 40 minutes, using a "sandmill". After adding a further 270 parts by weight of copolymer 1 solution and adjusting the viscosity with xylene/ethylgylcol acetate in the ratio of 1:1 to 25 seconds in a DIN cup having a 4 mm flow orifice, lacquers are obtained which are stable against flocculation for several months.

A reactive lacquer is prepared based on 70% by weight of copolymer and 30% by weight of an organic triisocyanate which has been obtained by reacting 3 mols of hexamethylene diisocyanate and 1 mol of water. The coatings produced therewith, which are stoved for 30 minutes at 80° C., give films having an insensitive surface, so that in motor vehicle repair lacquering the adhesive masking tapes can be removed before a completely cooled condition is reached, and assembly can be carried out. The "pot-life" of the clear lacquer combination of copolymer 1/ethylglycol acetate solution, which has been adjusted with xylene to a viscosity of 25 seconds, and the triisocyanate is such that, after storage at 23° C. for 8 hours, the viscosity is 40 seconds, measured in a DIN cup having a 4 mm flow orifice at 25° C. This shows that the binder combination can be processed over a working day of at least 8 hours, since a doubling of viscosity to 50 seconds is tolerated by the lacquer processor.

EXAMPLE 2

Reactive lacquer based on 70 percent by weight of copolymer 2 (A) and 30 percent by weight of an organic triisocyanate, both relative to the weight of solids.

62.5 g of copolymer 2/ethylglycol acetate solution (copolymer 2 (A), dissolved solids 80% by weight) are dissolved in a 1:1 mixture of xylene and ethylglycol acetate, together with 28.6 g of a 75% strength by weight solution of a triisocyanate which has a NCO content of 16.5-17.0% by weight and which has been obtained by reacting 3 mols of hexamethylene diisocyanate and 1 mol of water, and 0.5 g of diethylethanolamine are mixed in and the product is adjusted with xylene to a spraying viscosity of 25 seconds at 25° C., measured in a DIN cup having a 4 mm flow orifice, and is applied to glass plates at a wet film layer thickness of 90 μm and dried in air at 18° to 20° C. The pendulum hardness, measured by König's method (DIN 53,157) is 45 seconds after one day, 110 seconds after three days and 160 seconds after seven days. After stoving for 30 minutes at 80° C., the films gave pendulum hardnesses of 75 seconds, rising to 130 seconds after one day after storage at 23° C. and to 162 seconds after four days. After stoving for 30 minutes at 120° C., the films gave pendulum hardnesses of 165 seconds which did not alter further on storage. The cured films were particularly insensitive towards premium motor fuels and xylene.

After weathering for 16 months in the Florida climate, a top coat of lacquer (pigmented with 0.65 part by weight of rutile:1 part by weight of binder combination) applied to steel sheets which had been primed and zinc phosphated, gave a loss of gloss of only 12% compared with the gloss measured before weathering.

Further comparison tests to demonstrate the technical progress achieved

Assessment of the appearance of the copolymer solutions

The resin solutions are assessed in respect of flocculation of solid, insoluble constituents and in respect of turbidity of the resin solutions. As tests have shown, the solid, insoluble constituents can be filtered off. Turbidity of the resin solutions is not removed by filtration (see Table 1).

1=clear solution (highest value) 5=very strong milky turbidity (lowest value)
0=no flocculation
+ =flocculation of solid constituents As the results in Table 1 show, the copolymer solution used according to the invention is markedly superior to the known copolymer solutions.

Preparation of black top lacquers and assessment of the gloss of the films

A lacquer is prepared from the following components:

270 g of copolymer solution 1 (A) used according to the invention,
20 g of carbon black, as described in the Company Publication FW 200 of Messrs. Degussa,
4 g of diethylethanolamine,
10 g of silicone oil, as described in the Company Publication Silikonöl L 050 of Bayer, dissolved to form a 1% strength solution in xylene,
10 g of calcium naphthenate, a liquid having a content of 4% of calcium,
65 g of butyl acetate and
70 g of xylene, with the aid of a sand mill, grinding for about 60 minutes. After adding a further 270 g of copolymer solution 1 (A) used according to the invention and diluting with a solvent mixture consisting of equal parts by weight of xylene and butyl acetate to a flow viscosity of 23 seconds at 20° C., measured in a DIN cup having a 4 mm flow orifice, the lacquer is poured onto vertical glass plates and the degree of gloss is tested after the solvent has evaporated. High-gloss films are obtained which exhibit no deposition of pigment in the range between 1 and 10 μm. The weight ratio of binder to pigment is 95.6% by weight of binder to 4.4% by weight of pigment.

Pigmentation and run-off are carried out for the copolymers in the Comparison Tests 1, 2, 3 and 4 in the same manner and the gloss and the deposition of pigment of the lacquers are assessed. As the results in Table 1 show, the copolymer solution used according to the invention is superior to the known copolymer solutions.

1=high-gloss films with no deposition of pigment (highest value)
5=matt films and very high deposition of pigment (lowest value).

Testing the compatibility of the copolymer solutions 1 (A) and 2 (A) used (from Comparison Tests 1 and 2) with the thermoplastic copolymers 1 and 2

62 parts by weight of copolymer solution 1 (A), consisting of 50 parts by weight of copolymer and 12 parts by weight of ethyglycol acetate are mixed with 125 parts by weight of thermoplastic copolymer solution 1, consisting of 50 parts by weight of a thermoplastic copolymer and 75 parts by weight of toluene, and the mixture is diluted to a solids content of 40% by weight using a solvent mixture consisting of xylene and butyl acetate in a 1:1 weight ratio, and is applied to glass plates, and a dry film layer thickness of 200 to 300 μm was achieved.

After drying at room temperature, the appearance and the compatibility of the films were investigated. This mixture consists of 50% by weight of copolymer 1 (A) and 50% by weight of the thermoplastic copolymer 1.

The copolymer solutions 1 (A) and 2 (A), used according to the invention, and the copolymers from Comparison Tests 1 and 2 were mixed with the thermoplastic copolymers 1 and 2 in the manner described above and the mixtures were applied to glass plates and the resulting films were assessed. As the results in Table 2 show, the copolymer solutions used according to the invention are markedly superior to the known copolymer solutions.

Test for film appearance:
1 = high gloss (highest value)
5 = very cloudy film (lowest value)

Testing the "pot life" of reactive lacquers 86.6 g of the copolymer solution 1 (A) which is used and 40 g of a 70% strength by weight solution of a triisocyanate which contains biuret groups and has a NCO content of 16.5 to 17.0% by weight and has been obtained by reacting three mols of hexamethylene diisocyanate and one mol of water, are mixed and diluted with xylene to a flow viscosity of 25 seconds at 25° C., measured in a DIN cup having a 4 mm flow orifice, and the rise in viscosity after storage at 23° C. for 6 hours is determined.

The mixing ratio is 70% by weight of the copolymer 1 (A) used according to the invention and 30% by weight of the triisocyanate containing biuret groups.

A comparison combination is composed of 70% by weight of the copolymer from Comparison Test 2 and 30% by weight of the triisocyanate containing biuret groups.

A further comparison combination is composed of 77% by weight of copolymer from Comparison Test 1 and 23% by weight of the triisocyanate containing biuret groups, as described in French Pat. Specification No. 1,556,309.

The adjustment of viscosity is carried out in the same way using the solvent mixture described above. As the results in Table 3 show, the reactive lacquers according to the invention are markedly superior to the known reactive lacquers, since they have a longer processing life.

Preparation of pigmented two-component reactive lacquers and testing the run-off tendency of stoved films The ratio in the combination is 65% by weight of copolymer used according to the invention and 35% by weight of triisocyanate containing biuret groups. The proportion by weight of pigment: binder is 42%:58% by weight.

A lacquer paste is prepared from the following components:

- 80 g of copolymer solution 1 (A) used according to the invention,
- 73 g of titanium dioxide (rutile),
- 0.5 g of diethylethanolamine,
- 2.5 g of silicone oil, as described in the Company Publication Silikonöl L 050 of Bayer, dissolved to form a 1% strength solution in xylene,
- 2 g of calcium naphthenate, a liquid having a content of 4% of calcium,
- 4.5 g of Bentone-38 paste, dissolved to form a 10% strength by weight solution in xylene/methyl isobutyl ketone in the proportions 86:4 by weight, as described in the Company Publication of Messrs. Kronos Titan, and a solvent mixture of xylene and ethylglycol acetate in the proportions 1:1 by weight, by grinding for 24 hours in a ball mill. To this are added 46.6 g of a 75% strength by weight solution, dissolved in a mixture of xylene and ethylglycol acetate, of a triisocyanate which contains biuret groups and has a NCO content of 16.5 to 17.0% by weight and which has been obtained by reacting 3 mols of hexamethylene diisocyanate and one mol of water. This mixture is then diluted with a mixture of xylene, butyl acetate and ethylglycol acetate in the proportions 1:1:1 by weight, to a flow viscosity of 22 seconds at 23° C., measured in a DIN cup having a 4 mm flow orifice.

This reactive lacquer is applied by the spray application process to vertical steel sheets so that dry film layer thicknesses of 80 μm are obtained. The time of exposure to air between individual spray applications should be 30 seconds to one minute at most. After the spray application is completed, the lacquer film is exposed to air for approx. 5 minutes and stoved for 30 minutes at 120° C.

1. Comparison test of run-off tendency

The ratio in the combination is 77% by weight of copolymer from Comparison Test 1 and 23% by weight of triisocyanate containing biuret groups. The proportion by weight of pigment: binder is 42% by weight:58% by weight.

2. Comparison test of run-off tendency

The ratio in the combination is 65% by weight of copolymer from Comparison Test 2 and 35% by weight of triisocyanate containing biuret groups. The proportion by weight of pigment: binder is 42% by weight:58% by weight.

In the above Comparison Tests 1 and 2, the pigmentation and the spray application onto vertical steel sheets are carried out in the same manner as described above for the copolymer 1 (A) used according to the invention. The films are stoved for 30 minutes at 120° C.

As can be seen from Table 3, the reactive lacquers used according to the invention are markedly superior to the known reaction lacquers by having a lower run-off tendency.

Further comparison tests using reactive lacquers based on the copolymer solutions used and polyisocyanates in comparison with the known reactive lacquers of French Patent Specification 1,556,309

A reactive lacquer consisting of 70% by weight of copolymer, which corresponds to 86.6 g of the copolymer 1 (A) solution used according to the invention, and 30% by weight of triisocyanate, which corresponds to 40 g of a 75% strength by weight solution of a triisocyanate which is dissolved in a mixture of xylene and ethylglycol acetate and which has been prepared from 3 mols of hexamethylene diisocyanate and one mol of water and has an NCO content of 16.5 to 17.0% by weight, is diluted with acetone to a flow viscosity of 40 seconds at 25° C., measured in a DIN cup having a flow orifice of 4 mm. The solids content of this diluted resin solution is determined by evaporation at 120° C. for 60 minutes.

The resin solution is applied by spray application to a steel sheet, using one and a half cross-coats and exposing it to the air for approx. 1 minute between each cross-coat. After exposing the lacquered steel sheet to the air for 5 minutes, stoving is carried out for 30 minutes at 120° C. A smooth, blister-free and crater-free lacquer with a dry film layer thickness of 70 to 80 μm is obtained.

A reactive lacquer consisting of 70% by weight of copolymer, which corresponds to 87.6 g of the copolymer 2 (A) solution used, and 30% by weight of triisocyanate, which corresponds to 40 g of the triisocyanate described above, is prepared by mixing and is diluted, as described above, and the solids content is determined and a steel sheet is lacquered. After stoving, the lacquered steel sheet exhibits no craters or blisters at a dry film layer thickness of 70 to 80 μm.

A reactive lacquer consisting of 82.0% by weight of copolymer 1, which corresponds to 61.8 g of the copolymer 1 (A) solution used and 18.0% by weight, corresponding to 11 g, of 3-isocyanatomethyl-3,5,5-trimethylcyclohexyl isocyanate, is prepared by mixing and is diluted, as described above, to the same viscosity with acetone and the solids content is determined and a steel sheet is lacquered as described above. After stoving, the lacquered steel sheet exhibits no crater-formation or blistering and has a smooth surface with a dry film layer thickness of 70 to 80 μm.

A reactive lacquer consisting of 82.0% by weight of copolymer 2 (A), which corresponds to 62.5 g of the copolymer 2 (A) solution used, and 18.0% by weight, which corresponds to 11 g, of 3-isocyanatomethyl-3,5,5-trimethylcyclohexyl isocyanate, is prepared by mixing and is diluted, as described above, with acetone to the viscosity described above. The solids content of the resin solution was determined and a steel sheet was lacquered and stoved as indicated above. The lacquered sheet had a dry film layer thickness of 80 μm and gave a smooth, crater-free and blister-free surface.

The known reactive lacquers, which have the percentages by weight indicated in Table 4, are diluted in the same way with acetone to a flow viscosity of 40 seconds at 25° C., measured in a DIN cup having a 4 mm flow orifice. The resin solutions are also applied to steel sheets by spray application, using one and a half cross-coats and exposing the sheets to air for approx. 1 minute in each case after each half cross-coat. After the reactive lacquers have been applied, the sheets are exposed to air for 5 minutes and stoved for 30 minutes at 120° C. At first, only films having a dry film layer thickness of 40 to 50 μm were obtained. The surface exhibited many craters and blisters. If it is desired to achieve layer thicknesses of 70 to 80 μm of dry film with the known reactive lacquers, the spray application process must be increased to two and a half to three cross-coats. The films, which were then stoved, exhibited an even more strongly marked blistering and crater-formation than the films having lower dry film layer thicknesses. In addition, the solids content of the diluted resin solutions was determined as described above.

Additional advantages for the copolymer solutions used emerge clearly from these comparison tests.

Table 1

| | | Comparison tests on the copolymers | | | | |
|---|---|---|---|---|---|---|
| | | Copolymer 1 (A) which is used | Comparison Test 1 | Comparison Test 2 | Comparison Test 3 | Comparison Test 4 |
| Determination of solids content of the copolymer solutions at 120° C. for 60 minutes | | 81% | 50% | 50% | 80% | 80% |
| Appearance of the copolymer solutions | Turbidity | 1 | 2–3 | 4 | 3 | 5 |
| | Flocculation of solid constituents | 0 | + | 0 | 0 | 0 |
| Solids content, determined at 120° C. for 60 minutes, of the resin solutions which have been diluted with xylene to a flow viscosity of 25 seconds at 25° C., measured in a DIN cup having a 4 mm flow orifice | | 47% | 37% | 28% | 38% | 34% |
| Viscosity, measured by the Gardner-Holdt method at 23°C., of the resin solutions which have been diluted with ethylglycol acetate to a solids content of 70% | | $Z_2$ | — | — | The viscosity is higher than $Z_6$ | The viscosity is higher than $Z_6$ |
| Assessment of gloss and pigment deposition in black top lacquers | | 1 | 2–3 | 5 | 3 | 5 |

Table 2

Test of the compatibility of the copolymers 1 (A) and 2 (A) which are used and the Comparison copolymers 1 and 2, with the thermoplastic copolymers 1 and 2

| | 50% by weight of copolymer 1 (A) | 50% by weight of the copolymer in Comparison copolymer 1 | 50% by weight of the copolymer in Comparison copolymer 2 | 50% by weight of copolymer 2 (A) |
|---|---|---|---|---|
| 50% by weight of thermoplastic copolymer 1 | 1 | 2–3 | 4–5 | 1 |
| 50% by weight of thermoplastic copolymer 2 | 1 | 2–3 | 4–5 | 1 |

Test of appearance of film:
1 = high-gloss film (highest value)
5 = matt film (lowest value)

Table 3

Comparison tests on reactive lacquers consisting of combinations of copolymer 1 (A) and the Comparison copolymers 1 and 2, with triisocyanate

| | 70% by weight of copolymer 1 (A) which is used and 30% by weight of triisocyanate containing biuret groups | 77% by weight of copolymer from Comparison copolymer 1 and 23% by weight of triisocyanate containing biuret groups | 70% by weight of copolymer from Comparison copolymer 2 and 30% by weight of triisocyanate containing biuret groups |
|---|---|---|---|
| After stoving for 30 minutes at 120° C., the films are tested against 5 minutes exposure to acetone, applied by a cottonwool pad | Slight swelling | Fairly strong swelling | Slight swelling |
| Determination of "pot life" after storage for 6 hours at 230° C. | Rise in visocity to 30 seconds | Rise in viscosity to 45 seconds | Rise in viscosity to 95 seconds |
| Test of run-off tendency and crater-formation of lacquer combinations which are pigmented with titanium dioxide and have been stoved for 30 minutes at 120° C. | At a dry film layer thickness of 80 μm, no run-off tendency and no crater-formation | At a dry film layer thickness of 50 to 60 μm, a high run-off tendency; at 70 to 80 μm, considerable crater-formation | At a dry film layer thickness of 40 to 50 μm, considerable run-off tendency; at 50 to 60 μm, considerable crater-formation |

Table 4

| | Solids content, in % by weight, of the diluted resin solutions | Appearance of the films obtained from the reactive lacquers, after stoving |
|---|---|---|
| Reactive lacquer consisting of 70% by weight of copolymer 1 (A) used according to the invention and 30% by weight of triisocyanate | 67.5 | At 70–80 μm, no blistering or crater-formation |
| Reactive lacquer consisting of 70% by weight of copolymer 2 (A) used according to the invention and 30% by weight of triisocyanate | 70.2 | At 70–80 μm, no blistering or crater-formation |
| Reactive lacquer consisting of 82.0% by weight of copolymer 1 (A) used according to the invention and 18.0% by weight of isophorone diisocyanate+ | 68 | At 70–80 μm, no blistering or crater-formation |
| Reactive lacquer consisting of 82.0% by weight of copolymer 2 (A) used according to the invention and 18.0% by weight of isophorone diisocyanate+ | 72 | At 70–80 μm, no blistering or crater-formation |
| Reactive lacquer consisting of 77% by weight of Comparison copolymer 1 and 23% by weight of triisocyanate | 52 | At 40–50 μm, blistering and crater-formation. At 70–80 μm, increased blistering and crater-formation |
| Reactive lacquer consisting of 70% by weight of Comparison copolymer 2 and 30% by weight of triisocyanate | 47 | At 40–50 μm, considerable blistering and crater-formation. At 70–80 μm, the whole film is full of blisters and craters |
| Reactive lacquer consisting of 85.7% by weight of Comparison copolymer 1 and 14.3% by weight of isophorone diisocyanate+ | 52.5 | At 40–50 μm, blistering and crater-formation. At 70–80 μm, increased blistering and crater-formation |
| Reactive lacquer consisting of 82.0% by weight of Comparison copolymer 2 and 18.0% by weight of isophorone diisocyanate+ | 48 | At 40–50 μm, considerable blistering and crater-formation. At 70–80 μm, 75% of the film is full of blisters and craters |

As can be seen from Table 4, the reactive lacquers used according to the invention are superior to the known reactive lacquers.

+3-Isocyanatomethyl-3,5,5-trimethylcyclohexyl isocyanate

The following are examples of reactive melamine resins which can be used: monomethylol-pentamethoxymethylenemelamine, dimethylol-tetramethoxymethylenemelamine or trimethylol-trimethoxymethylenemelamine, on their own or as mixtures.

I claim:

1. A coating binder composition, dissolved in solvents which do not contain active hydrogen atoms, composed of a binder (A) comprising a mixture of a copolymer which contains hydroxyl groups and which is a reaction product from mixtures of polymerizable vinyl compounds which contain $\alpha,\beta$-ethylenically unsaturated monocarboxylic acids and styrene and glycidyl esters and (B), polyisocyanate wherein component A consists of 60–80 percent by weight of hydroxyl group containing copolymers, having a total hydroxyl group content of 3.5 to 6.5 percent by weight, prepared in the presence of a mixture of a diacyl peroxide or perester and an alkyl hydroperoxide or dialkyl peroxide as polymerization initiators, from:
   (a) 5–24 percent by weight of glycidyl ester of alkanemonocarboxylic acids selected from the group consisting of $\alpha$-alkyl-alkanemonocarboxylic acids and $\alpha,\alpha$-dialkylalkanemonocarboxylic acids of the following empirical formula $C_{12-14}H_{20-26}O_3$, and slow, uniform addition to said glycidyl esters (a) of
   (b) 12–30 percent by weight of compounds selected from the group consisting of hydroxyethyl acrylate and hydroxyethyl methacrylate,
   (c) 1–10 percent by weight of acrylic acid,
   ($d_1$) 20–50 percent by weight of styrene, and
   ($d_2$) 5–35 percent by weight of methyl methacrylate, the components a, b, c, $d_1$, and $d_2$, based on 100 percent by weight of components a to $d_2$, and the polymerization and condensation reactions taking place simultaneously and jointly, with the additional condition that components a, b, and c are employed in such quantities that the copolymer component A has a hydroxyl group content of 3.5 to 6.5 percent by weight, and component B consists of 20 to 40 precent by weight of an organic polyisocyanate, it being necessary that components A and B together give a numerical value of 100 percent by weight.

2. A composition according to claim 1, wherein component A contains 63 to 68 percent by weight of the copolymers which contain hydroxyl groups and component B contains 32 to 37 percent by weight of an organic triisocyanate which has been obtained by reacting 3 mols of hexamethylene diisocyanate and 1 mol of water, it being necessary that A and B together give a numerical value of 100 percent by weight.

3. A composition according to claim 1, wherein 1 to 10 percent by weight of reactive melamine resins, relative to the weight of the binder component, are used as an additional binder.

4. A composition according to claim 1, wherein component A is a solution containing 10 to 30 percent by weight of inert organic solvents which are customary in the lacquer industry and 70 to 90 percent by weight of copolymers, it being necessary that the percentages of components A and B add up to 100 percent by weight.

5. A coating composition according to claim 1, wherein component A comprises a copolymer which has a hydroxyl group content of $4.5\pm0.3$ percent by weight and which component A copolymer is obtained from a mixture consisting of
   A"—20–25 percent by weight of ethylglycol acetate and
   B"—75–80 percent by weight of a reaction mixture of the components a to $d_2$:
   (a) 11–12 percent by weight of glycidyl ester of $\alpha,\alpha$-dialkylalkanemonocarboxylic acids of the following empirical formula $C_{13}H_{24}O_3$ which have been obtained by reacting tripropylene, carbon monoxide and water and which consist essentially of monocarboxylic acids with highly branched $C_{10}$ chains, being heated with the ethylglycol acetate to 165° to 170° C., and a mixture consisting of
   (b) 25–26 percent by weight of compounds selected from the group consisting of hydroxyethyl acetate and hydroxylethyl methacrylate,
   (c) 3–4 percent by weight of acrylic acid,
   ($d_1$) 44–48 percent by weight of styrene,
   ($d_2$) 10–16 percent by weight of methyl methacrylate,
   (e) 2–2.5 percent by weight of tert.-butyl perbenzoate, and
   (e') 1–1.5 percent by weight of cumene hydroperoxide,
dissolved to form an 80 percent strength solution in a mixture of alcohols, ketones and cumene,
it being necessary that the sum of the monomers a to $d_2$ add up to 100 percent by weight, said reaction mixture B" being added slowly and uniformly to component A" in the course of 6 to 10 hours and the temperature of said mixture A" plus B" being kept at $170\pm5°$ C. in the course thereof, until the solids content of the solution has reached a value of $80\pm1$ percent by weight, the polymerization and condensation reactions taking place jointly and simultaneously and the copolymer having a hydroxyl group content of $4.5\pm0.3$.

6. A coating composition according to claim 5, wherein compound a of component B" is a mixture of glycidyl esters of $\alpha,\alpha$-dialkylalkanemonocarboxylic acids having up to about 10 percent by weight of glycidyl ester of $\alpha,\alpha$-dialkylalkanemonocarboxylic acids of the said empirical formula, the mixture having an epoxide equivalent of 240 to 250.

7. A coating composition according to claim 1, applied to a sheet-like structure, and from which composition so applied, solvents are removed by air drying.

* * * * *

UNITED STATES PATENT AND TRADEMARK OFFICE
CERTIFICATE OF CORRECTION

PATENT NO. : 4,177,183

DATED : December 4, 1979

INVENTOR(S) : Horst Dalibor

It is certified that error appears in the above—identified patent and that said Letters Patent is hereby corrected as shown below:

[73] ASSIGNEE; "Aktiengeselischaft" should read -- Aktiengesellschaft --

Col. 4, line 48; "lacequers" should read -- lacquers --

Col. 6, line 41; "HO—CH$_2$—CH—CH$_2$—O—C(=O)—R" should read

-- HO—CH$_2$—CH—CH$_2$—O—C(=O)—R --

Col. 7, line 21; "α,β-" should read -- α,α- --

Col. 9, line 58; "mixture" should read -- mixtures --

Col. 10, line 11; "hydoxyethyl" should read -- hydroxyethyl --

Col. 11, line 48; "alkyalkanemonocarboxylic" should read
-- alkylalkanemonocarboxylic --

Col. 11, last formula; "CH$_2$=CH—C(=O)—" should read -- CH$_2$=CH—C(=O)— --

Col. 12, first formula; "CH$_2$=CH—C(=O)—" should read -- CH$_2$=CH—C(=O)— --

Col. 12, lines 31 & 32; "C$_{12-14}$H$_{20-2-}$ $_6$O$_3$" should read -- C$_{12-14}$H$_{20-26}$O$_3$ -- (The 26 should not be hyphenated at the end of a line).

UNITED STATES PATENT AND TRADEMARK OFFICE
CERTIFICATE OF CORRECTION

PATENT NO. : 4,177,183
DATED : December 4, 1979
INVENTOR(S) : Horst Dalibor

It is certified that error appears in the above—identified patent and that said Letters Patent is hereby corrected as shown below:

Col. 15, line 13; "taste" should read -- paste --
Col. 16, lines 17 & 18; Example 9 should be lined up (starting at the left margin) like Examples 1-8 and Example 10.
Col. 21, line 7; "ethyglycol" should read -- ethylglycol --
Table 3, Col. 2 and line 16 of Table; "visocity" should read -- viscosity --

Signed and Sealed this

Tenth Day of June 1980

[SEAL]

Attest:

SIDNEY A. DIAMOND

Attesting Officer

Commissioner of Patents and Trademarks